United States Patent Office 3,347,623
Patented Oct. 17, 1967

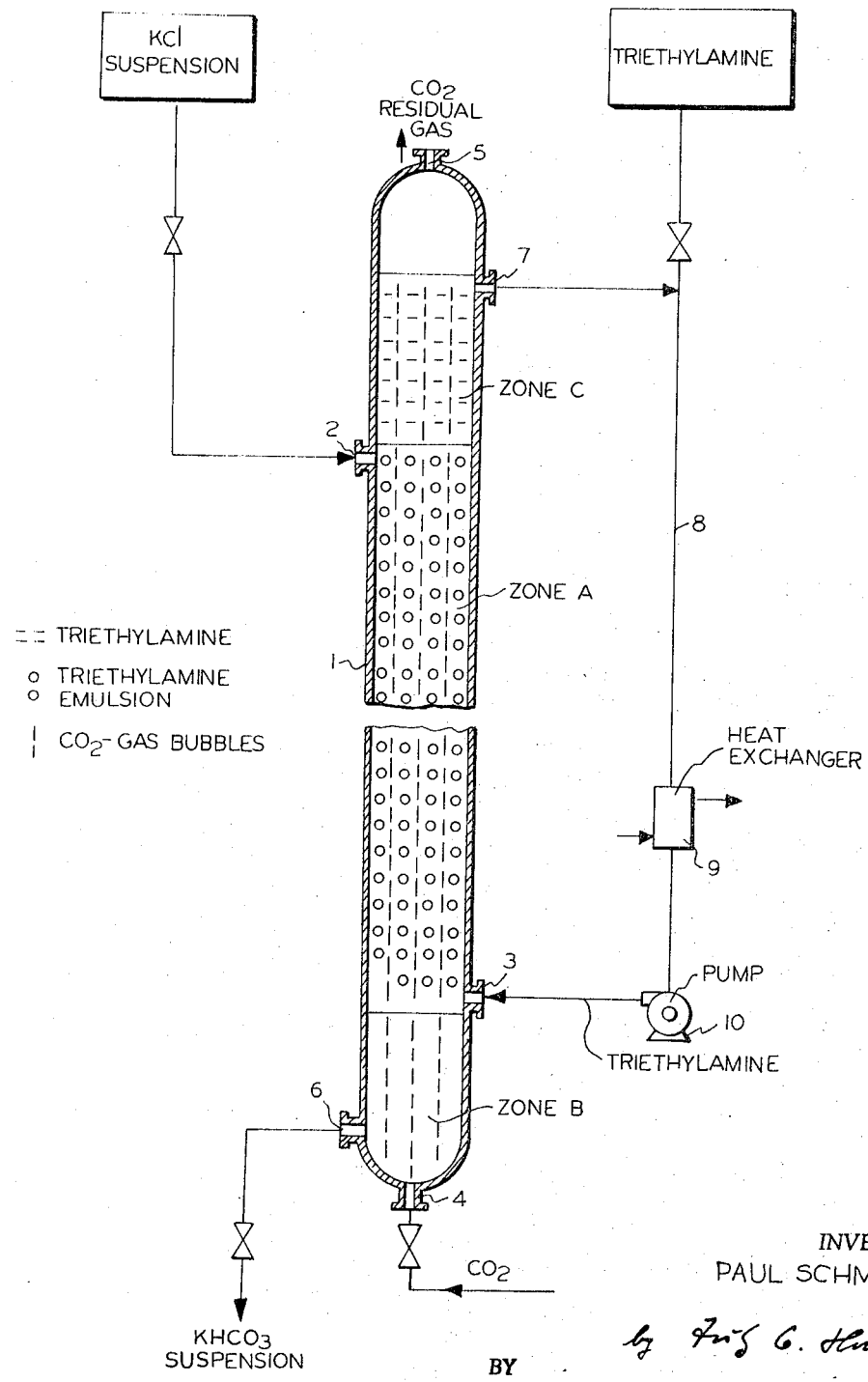

3,347,623
PREPARATION OF POTASSIUM BICARBONATE
Paul Schmid, Heilbronn, Germany, assignor to Kali-Chemie Aktiengesellschaft, Hannover, Germany
Filed Nov. 3, 1966, Ser. No. 591,840
5 Claims. (Cl. 23—64)

This application is a continuation-in-part of my application Ser. No. 438,312, filed Mar. 9, 1965, now abandoned, which, in turn, is a continuation-in-part of my application Ser. No. 304,940, filed Aug. 27, 1963, now abandoned.

This invention relates to the continuous preparation of potassium bicarbonate from potassium chloride.

It is well known that the Solvay process allows only the preparation of sodium bicarbonate.

Many attempts have been made to modify that process by replacing ammonia with amines, so as to obtain also potassium bicarbonate. Already in 1878, the British specification No. 3,967 disclosed a process where an aqueous trimethylamine-potassium chloride solution was introduced from above into a reaction vessel and carbon dioxide was injected into the bottom of the vessel, whereby the reaction mixture was repeatedly drawn from the bottom and recycled into the vessel. In spite of the recycling of the aqueous trimethylamine-potassium chloride solution, the yield of said process was so low as to prohibit commercial utilization. Later, it was proposed to prepare potassium bicarbonate by introducing carbon dioxide under pressure into an aqueous solution of potassium chloride and a mixture of methylamines. Neither did this method produce satisfactory results, nor similar methods with primary and secondary alkylamines of alkyl groups having up to 4 carbon atoms.

A simpler and more economic process was found when the water-insoluble triethylamine, which had been considered unsuitable for this purpose, was employed as a reaction component. According to Patent No. 3,189,409, which is assigned to the same assignee as this application, triethylamine is combined with a saturated aqueous potassium chloride solution, and carbon dioxide is introduced into said mixture with vigorous stirring, whereby the temperature is maintained at about 50° C. Thereby the carbon dioxide reacts with the triethylamine to form triethylamine bicarbonate, which dissolves in the aqueous solution and reacts with the potassium chloride to potassium bicarbonate. It has been found of advantage to employ triethylamine in excess of the stoichiometrically required amount.

Instead of introducing carbon dioxide into the triethylamine-containing potassium chloride solution, it is also possible to add to the potassium chloride solution directly a triethylamine bicarbonate solution as obtained by introducing carbon dioxide into a mixture of triethylamine and water. A particular advantage of this modification consists in the simple processing of the mother liquor, due to the insolubility of the triethylamine in water.

After the triethylamine has been set free by addition of lime, it separates as a second layer from the mother liquor and can be recovered by decanting.

Said process produces very pure potassium bicarbonate but is unsatisfactory for commercial operation because it can be carried out only as a batch process.

In my prior application Ser. No. 304,940, referred to above, I have disclosed and claimed a method for the continuous preparation of potassium bicarbonate which comprises providing a column consisting essentially of an upper zone, a middle precipitation zone proper, and a lower collecting zone. An aqueous saturated potassium chloride solution is continuously introduced at the top of the precipitation zone, triethylamine in stoichiometric excess over the potassium chloride is continuously introduced at the bottom of the precipitation zone, and the temperature in said zone is maintained at 40 to 50° C. The excess triethylamine is withdrawn from the upper zone and, after addition of fresh triethylamine, returned to the bottom of the precipitation zone. Carbon dioxide in stoichiometric excess over potassium chloride is introduced into the column at a point below the inlet for the triethylamine and withdrawn from the top of the column; in this way, the carbon dioxide maintains the precipitated crystalline potassium bicarbonate in suspension and frees the same from the adhering malodorous insoluble triethylamine by converting the same to water soluble triethylamine bicarbonate. The crystalline potassium bicarbonate and the used up mother liquor are continuously withdrawn from the bottom of the collecting zone; the withdrawn suspension is cooled with agitation and the potassium bicarbonate is separated from the mother liquor, While formerly the low specific gravity and the low water solubility of the triethylamine had been considered properties which prohibit its use in the preparation of bicarbonates, I had found that just these properties, properly used, made it possible to prepare potassium bicarbonate in a continuous operation.

However, though it had been possible in this way to solve the problem of a continuous potassium bicarbonate preparation process, this solution was still not quite satisfactory for commercial production because the obtainable yields remained below the yields obtained in the batch process of Patent No. 3,189,409.

I have now found that, contrary to observations reported by former researchers, the addition of solid potassium chloride in an amount of at least 20 percent by weight, calculated on the total potassium chloride present, to the reaction system of my prior application Ser. No. 304,940, raises the yield of potassium bicarbonate to such a surprising extent that the process becomes economic in commercial production.

An apparatus suitable for carrying out the invention is essentially similar to the apparatus described in said prior application and shown in the accompanying drawing.

The apparatus comprises a cylindrical precipitation column 1 which is divided into 3 zones C, A, and B. The middle zone A constitutes the reaction zone proper and is preferably provided with means for a fine homogeneous distribution of the carbon dioxide and triethylamine. A saturated potassium chloride solution containing solid potassium chloride in suspension is introduced through inlet 2 at the upper end of zone A, and triethylamine is introduced at the bottom of zone A through the lateral inlet 3. Due to its lower specific gravity, the triethylamine rises upwardly through zone A in countercurrent to the aqueous potassium chloride suspension and reacts, in form of the triethylamine bicarbonate, with the potassium chloride to form potassium bicarbonate and triethylamine hydrochloride, which latter dissolves in the down flowing aqueous phase and passes together with the precipitated potassium bicarbonate into zone B from where both are withdrawn with the spent mother liquor through outlet 6. Carbon dioxide is introduced at the bottom of the column at 4, and passes through all three zones and leaves the column at the top at 5. The rising carbon dioxide bubbles impart turbulence to the aqueous phase and to the oily triethylamine phase.

On top of the reaction zone A, the column forms a zone C for collecting the unreacted triethylamine, which, due to its low water solubility and low specific gravity, separates from the aqueous phase; it is recycled over outlet 7, line 8, pump 10 through inlet 3 into the reaction zone A. A heat exchanger 9 may be provided in line 8.

The addition of the triethylamine can be so adjusted as to have at all times an excess to be withdrawn through 8 for recycling. Such cycle process ensures that there is always in the reaction zone a sufficient amount of triethylamine to effect the reaction. However, I have found that a large excess of triethylamine is not absolutely necessary and that an excess of about 0.2 mole over the stoichiometric amount may be generally sufficient.

In order to obtain best results, the system must contain 6.5 to 7 moles of water per mole of triethylamine. Only when this ratio is maintained, almost the entire amount of introduced triethylamine can be dissolved during passage through the precipitation zone, by reaction with the carbon dioxide, as triethylamine bicarbonate so as to present a sufficient quantity thereof in all reactor zones. Furthermore, for a good yield of potassium bicarbonate, the ratio of triethylamine to potassium chloride should be maintained in the range from 1.2:1 to 1.5:1.

From the foregoing, it ensues that the mole ratio of potassium chloride:triethylamine:water introduced into the precipitation zone should be within the range between 1:1.2:7.8 and 1:1.5:10.5, i.e. 1 mole of potassium chloride should be dissolved in 7.8 to 10.5 moles of water when 1.2 to 1.5 moles of triethylamine are introduced. However, a molar ratio of triethylamine:potassium chloride of, e.g., 1.3:1 requires 48 g. of potassium chloride for 100 g. of water; this amount is completely soluble only at 70° C., i.e. at a temperature where the process is no longer economic.

I have found that solid potassium chloride suspended in a saturated aqueous solution dissolves on its passage through the reactor at the same rate as the potassium chloride in solution is converted to potassium bicarbonate. Therefore, by using a suspension of solid potassium chloride in a saturated aqueous potassium chloride solution, the optimum molar ratio of potassium chloride to water, recited hereinabove, can be established already at temperatures of 30° C. and below. This has the additional advantage of increasing the rate of precipitation of the formed potassium bicarbonate because the solubility of the latter decreases with decreasing temperature. As a result, much higher yields can be obtained.

As a further advantage of the use of solid potassium chloride, its negative heat of solution compensates the heat of the potassium bicarbonate reaction, which makes it easier to control the temperature of the reactor.

The potassium chloride suspension may be prepared by introducing solid potassium chloride into a cold saturated solution of potassium chloride, or by cooling a hot saturated potassium chloride solution.

The proportion of the solid potassium chloride in the suspensions at temperatures between 5 and 30° C. is about 40 to about 20 percent by weight of the total potassium chloride introduced into the system, depending on the desired temperature in the reactor which should be between 20° and 50° C.

It is of advantage to employ the solid potassium chloride in fine crystalline form because coarse grains dissolve too slowly. In the latter case, there is the risk that unreacted potassium chloride is entrained with the mother liquor. If 100% potassium chloride is used, a pure end product is obtained. For the production of potassium bicarbonate of technical purity, the 60 fertilizer salt obtained by flotation can be used, which has a potassium chloride content of 95 to 96 percent. By recrystallization, a potassium bicarbonate of high purity can be prepared from such technical grade bicarbonate.

It is not necessary that the employed triethylamine is completely anhydrous but the water introduced with the triethylamine must be taken into account when calculating the amount of water to be introduced into the precipitation column. When the concentrations of the reactant are maintained within the ranges outlined hereinabove, there arrives generally very little unreacted triethylamine into zone C. Carbon dioxide is preferably introduced in excess in order to produce turbulence of the precipitated potassium bicarbonate, so as to obtain removal of the adhered triethylamine, and to prevent excessively fast settling of the solids. The pressure of the carbon dioxide with which it is passed into the precipitation column, depends on the height and specific gravity of the liquid column, and, in addition, on the resistance of any subsequent apparatus for washing or absorbing the waste gases.

The unreacted carbon dioxide, which will contain triethylamine vapors due to the high vapor pressure of the latter, is withdrawn from the top of the column, cooled, and can, without separation of the entrained triethylamine, be passed into the suction side of the compressor supplying the gas, and will be returned, after replacement of the consumed amount, into the process. Such a carbon dioxide cycle process allows of omitting specific operations for the recovery of the triethylamine vapors.

The rate of passage of the potassium chloride suspension through the reaction zone of the precipitation column, for a given height and diameter of said column, is so adjusted that the drained mother liquor does not contain any substantial amounts of solid and dissolved potassium chloride.

If the reaction is carried out at a temperature above 15° C., it is of advantage to cool the mother liquor withdrawn through outlet 6 in a stirrer before separation of the potassium bicarbonate. In this way, I make use of the high temperature coefficient of the solubility of the potassium bicarbonate in order to precipitate still dissolved portions thereof. This cooling step increases the yield and improves the economy of the process.

The following table shows the results of three comparative tests made in accordance with the process described in application Serial No. 304,940, i.e., with a saturated solution of potassium chloride, and with a saturated solution containing solid potassium chloride in suspension, in accordance with this invention.

All examples were made with the same total amount of potassium chloride (40 kg./hours) in the same column of the type shown in the drawing. The column had a height of 19.2 m. and an inner diameter of 30 cm.

Examples 2 and 3 were made at the same low temperature of 10° C. As the solubility of potassium chloride at said temperature is rather low, a rather large amount of water has to be used so as to produce a rather unfavorable KCl:triethylamine:water ratio. In order to obtain a more favorable ratio, Example 1 was made at a temperature of 50° C., again with a saturated KCl solution, without solid KCl.

TABLE

|  | Example 1 without solid KCl | Example 2 with solid KCl | Example 3 without solid KCl |
|---|---|---|---|
| Amount of saturated KCl solution | 112 l./h | 90 l./h | 150 l./h. |
| Saturation temperature | 50° C | 10° C | 10° C. |
| Solubility of KCl at test temperature | 357 g. KCl/l | 267 g. KCl/l | 267 g. KCl/l. |
| Specific gravity of solution | 1.20 | 1.16 | 1.16. |
| Amount of dissolved KCl (kg.) | 112×0.357=40.0 | 90×0.267=24.0 | 150×0.267=40. |
| Weight of solution (kg.) | 112×1.20=134.4 | 90×1.16=104.4 | 150×1.16=174. |
| Water in solution (kg.) | 94.4 | 80.4 | 134. |
| Solid KCl (kg.) |  | 16.0 |  |
| Total KCl in kg./hour | 40.0 | 40.0 | 40. |
| Addition of 95% triethylamine l/hour | 97 l | 97 l | 97 l. |
| Percent of solid KCl in suspension |  | 40 |  |
| Mole ratio KCl:triethylamine | 1:1.24 | 1:1.24 | 1:1.24. |
| Mole ratio KCl:water | 1:10.3 | 1:8.7 | 1:14.3. |
| Mole ratio triethylamine:water | 1:8.3 | 1:7.0 | 1:11.5. |
| Mole ratio KCl:triethylamine:water | 1:1.24:10.3 | 1:1.24:8.7 | 1:1.24:14.3. |
| Temperature at head of column | 50° C | 20–25° C | 20–25° C. |
| Temperature at outlet of KHCO₃ | 50° C | 40° C | 40° C. |
| Temperature of KHCO₃ suspension after cooling | 12° C | 12° C | 12° C. |
| Yield KHCO₃ after centrifuging and drying | 42 kg | 51 kg | 34.9 kg. |
| Yield calculated on KCl | 78% | 95% | 65%. |

The examples show that at a temperature of the introduced KCl phase of 10° C., the yield according to the suspension process of the invention is increased by almost 50 percent over the solution process; even if the temperature of the KCl solution is raised to 50° C. (Example 1), my novel suspension process carried out at 10° C. still produces a 20% better yield.

I claim:
1. A method for the continuous preparation of potassium bicarbonate comprising providing a column consisting essentially of an upper zone, a middle precipitation zone proper, and a lower collecting zone, introducing continuously at the top of said precipitation zone an aqueous saturated potassium chloride solution having a temperature of about 5 to 30° C. and containing at least 20 percent of potassium chloride, calculated on the total potassium chloride present, in solid form in suspension, introducing triethylamine at the bottom of said precipitation zone, adjusting the mole ratio of potassium chloride:triethylamine:water in said precipitation zone within the range between 1:1.2:7.8 and 1:1.5:10.5, maintaining said precipitation zone at a temperature of 20 to 50° C., introducing carbon dioxide in stoichiometric excess over the potassium chloride below the inlet of the triethylamine, thereby maintaining the downward flowing precipitated crystalline potassium bicarbonate in suspension and purifying it from adhered insoluble triethylamine by converting the same to water soluble triethylamine bicarbonate, withdrawing continuously crystalline potassium bicarbonate and exhausted mother liquor from the bottom of the collecting zone, and separating the potassium bicarbonate from the mother liquor.

2. The method as claimed in claim 1 wherein the saturated potassium chloride solution contains 20 to 40 percent by weight of the total potassium chloride in solid form.

3. The method as claimed in claim 1 wherein the excess triethylamine is recycled from the upper zone of the column to the bottom of the precipitation zone with addition of fresh triethylamine.

4. The method as claimed in claim 1 wherein the excess of carbon dioxide is withdrawn from the top of the column and returned, after replacement of the consumed amount, into the process.

5. The method as claimed in claim 1 comprising stirring and cooling the withdrawn potassium bicarbonate and mother liquor and separating the precipitated potassium bicarbonate from the mother liquor.

References Cited

UNITED STATES PATENTS 3,111,379   11/1963   Gancy et al. _____ 23—64
3,189,409    6/1965   Wolstein _____ 23—64

FOREIGN PATENTS 3,967   1878   Great Britain

OCSAR R. VERTIZ, *Primary Examiner.*

G. T. OZAKI, *Assistant Examiner.*